(12) United States Patent
Current

(10) Patent No.: US 12,630,080 B2
(45) Date of Patent: May 19, 2026

(54) OPEN CARGO SPACE ACCESS DOOR INDICATOR DEVICE

(71) Applicant: Harold Pete Current, Winchester, KY (US)

(72) Inventor: Harold Pete Current, Winchester, KY (US)

( * ) Notice: Subject to any disclaimer, the term of this patent is extended or adjusted under 35 U.S.C. 154(b) by 391 days.

(21) Appl. No.: 18/216,592

(22) Filed: Jun. 30, 2023

(65) Prior Publication Data

US 2024/0001840 A1      Jan. 4, 2024

Related U.S. Application Data

(60) Provisional application No. 63/473,853, filed on Jun. 30, 2022.

(51) Int. Cl.
B60Q 1/50 (2006.01)
B60Q 9/00 (2006.01)

(52) U.S. Cl.
CPC    B60Q 1/50 (2013.01); B60Q 9/00 (2013.01)

(58) Field of Classification Search
CPC ... B60Q 1/50; B60Q 9/00; B60Q 3/30; B60Q 1/324
USPC ................................................ 116/28 R, 116
See application file for complete search history.

(56) References Cited

U.S. PATENT DOCUMENTS

| | | | | |
|---|---|---|---|---|
| 5,602,526 A | * | 2/1997 | Read | B60Q 3/30 |
| | | | | 116/28 R |
| 5,828,299 A | * | 10/1998 | Chen | B60Q 1/0076 |
| | | | | 340/545.7 |
| 6,089,588 A | * | 7/2000 | Lesesky | B60D 1/62 |
| | | | | 280/446.1 |
| 6,326,899 B1 | * | 12/2001 | Chisnall | B60J 5/08 |
| | | | | 296/186.4 |
| 6,374,766 B1 | * | 4/2002 | Clark | B60Q 1/30 |
| | | | | 116/28 R |
| 6,765,481 B2 | * | 7/2004 | Haigh | G09F 21/04 |
| | | | | 340/545.4 |
| 6,783,267 B1 | * | 8/2004 | Yeoman | B60Q 3/74 |
| | | | | 362/540 |

FOREIGN PATENT DOCUMENTS

ES          2428988 B2  *   2/2015   ...........  B60Q 1/2665

* cited by examiner

*Primary Examiner* — Kristina M Deherrera
*Assistant Examiner* — Evan Mancini
(74) *Attorney, Agent, or Firm* — Stockwell & Smedley, PSC

(57)          ABSTRACT

An indicator device which is positioned to be visible in the side mirror field of view from the operating position of a motor vehicle and configured to indicate when an access door to the motor vehicle is in the open condition.

6 Claims, 3 Drawing Sheets

OPEN CARGO SPACE ACCESS DOOR INDICATOR DEVICE

BACKGROUND OF THE INVENTION

The invention relates generally to systems, devices and methods for indicating whether a motor vehicle door that is not visible from the position of the motor vehicle operator is in the open condition, and more particularly to systems, devices and methods for providing a visual indication that the rear door of a tractor trailer is open that is readily visible on the external surface of the trailer section from the position of the tractor trailer operator in the cab section.

It is obviously important to ensure that the doors of a motor vehicle are closed prior to driving. For at least this reason, most motor vehicles include a dashboard indicator to detect an open door and warn the motor vehicle operator that the door is not closed. In motor vehicles such as cars, open doors are usually readily visible to the motor vehicle operator.

Some motor vehicles, like trucks and vans designed for carrying cargo, have rear access doors, such as dual swinging or roll-up doors, that are not readily visible from the position at which the motor vehicle is operated. Some of these motor vehicles, such as tractor trailers, have independent detachable cargo carrying sections which can be mechanically coupled to the cab section. For these vehicles, wires from the cargo carrying section must be connected to the cab section along with the mechanical coupling to indicate the open condition of the access door at the dashboard. This can be expensive to maintain and unreliable at least because these motor vehicles are designed to be connected to a vast amount and variety of cargo carrying sections. Furthermore, a dashboard indicator light can often be overlooked on any vehicle dashboard, particularly when the dashboard has a plethora of indicators and gauges as in the case of a cargo carrying vehicle such as a tractor trailer. While the condition of the non-visible access doors can easily be checked prior to driving, many operators of such vehicles are not involved in the cargo loading process and are often operating in a rush on a tight schedule, and accordingly, errors may be made.

It should be readily apparent that leaving open a cargo space access door of a cargo carrying vehicle during transit can have devastating consequences. Thus, there is a need for improvement and solution to address the aforementioned issues, among others things, by providing an indicator of an open access door.

SUMMARY OF THE INVENTION

The invention provides an indicator device which is positioned to be visible to the operator of a motor vehicle from the operating position and configured to signal when an access door to the motor vehicle is in the open condition.

Some embodiments of the invention are directed to an indicator device which indicates when a door to an enclosed cargo space associated with a motor vehicle is in the open condition, the enclosed cargo space having an internal illumination device for lighting the enclosed cargo space of the motor vehicle, the internal illumination device illuminating responsive to the door being in the open condition, the indicator device comprising: a body having a lateral wall defining a first lateral wall side and a second lateral wall side, wherein the first lateral wall side opposes the second lateral wall side, and an attachment portion adjacent to the first lateral wall side, wherein the attachment portion is configured to facilitate attaching the body to an external surface of the motor vehicle whereby the first lateral wall side is proximal to the wall of the vehicle and the second lateral wall side is distal from the external surface of the motor vehicle, the first lateral wall side protruding from the external surface of the motor vehicle; an open door indicator illumination device mounted on the lateral wall between the first lateral wall side and the second lateral wall side; and a connector in communication with the illumination device and operatively associated with at least one of the door or the internal illumination device, wherein the connector actuates illumination of the open door indicator illumination device responsive to one of the door being in the open condition or the illumination of the internal illumination device.

In some embodiments, the body includes an attachment wall, the attachment wall defining a first attachment wall edge and a second attachment wall edge, the first attachment wall edge opposing the second attachment wall edge, wherein the attachment portion is defined on the attachment wall.

In some embodiments, the first attachment wall edge is connected to the first lateral wall side. The attachment wall may be substantially perpendicular to the first lateral wall side.

In some embodiments, the lateral wall is angularly positioned with respect to the external surface of the motor vehicle, whereby the lateral wall protrudes outwardly at angle from the first lateral wall side to the second lateral wall side. In some embodiments, the angle formed by the attachment wall and the first lateral wall side is an acute angle.

In some embodiments, the body includes a support wall, the support wall defining a first support wall edge connected with the second attachment wall edge and a second support wall edge connected with the second lateral wall side. The support wall may be parallel to the first lateral wall side, and/or perpendicular to the attachment wall. In some embodiments, the support wall is wider than the width of the first lateral wall side.

In some embodiments, the body is attached by the attachment portion on the external surface of the motor vehicle at location within the field of view of the driver side mirror, thus enabling the driver to view the open door indicator illumination device through the driver side mirror while seated in the motor vehicle operating position. In some embodiments, the first lateral wall side defines a protruding shoulder for positioning the open door illumination device a distance from the attachment wall and external surface of the motor vehicle such that the open door illumination device is within the field of view of the driver side mirror.

In some embodiments, the connector comprises a wired connection with an electrical power supply to the internal illumination device, such as by connecting the connector with an existing electrical harness used to electrically connect a tractor trailer cab with a trailer, the wired connection supplying electrical power to the open door indicator illumination device, wherein the open door indicator illumination device illuminates responsive an electrical connection being formed to illuminate the internal illumination device.

In some embodiments, the connector comprises a wired connection to the internal illumination device, the wired connection supplying electrical power to the open door indicator illumination device, wherein the open door indicator illumination device illuminates responsive to illumination of the internal illumination device.

In some embodiments, the connector comprises a wireless communication device, the wireless communication device including a wireless receiver and a wireless transmitter, and a power source, such as a rechargeable, replaceable or solar powered battery, the wireless receiver and the power source being mounted in the body, wherein the wireless transmitter is operatively associated with one of the internal illumination device or the door, and is configured to transmit a signal to the wireless receiver responsive to the door being in the open condition, the wireless receiver actuating the power source to cause the illumination of the open door indicator illumination device responsive to receiving the signal from the wireless transmitter.

In some embodiments, the open door illumination device is configured to illuminate in colors or patterns, such as flashing, responsive to the internal illumination device being illuminated to indicate the door is in the open condition.

Other embodiments, features and advantages of the invention will be readily appreciated and apparent from the following detailed description when considered in connection with the accompanying drawings.

BRIEF DESCRIPTION OF THE DRAWINGS

Various advantages of the invention will be readily appreciated as the same becomes better understood by reference to the following detailed description when considered in connection with the accompanying drawings. The components in the figures are not necessarily to scale, and certain features and elements have been removed or left out, emphasis instead being placed upon illustrating the principles of the invention.

DETAILED DESCRIPTION OF THE INVENTION

The following detailed description provides exemplary embodiments of systems, devices and methods for providing an indication that a motor vehicle door is in the open condition which is positioned to be visible in the field of view of the driver side mirror and/or passenger side mirror. However, it will be readily understood from the description of the embodiments of the invention herein, and the elements thereof, could be alternatively configured within the scope of the invention. This description is therefore intended to generally describe and illustrate examples of the invention, but is not intended to limit the scope of the invention to the examples, embodiments and elements described herein.

Figures 1, 2:
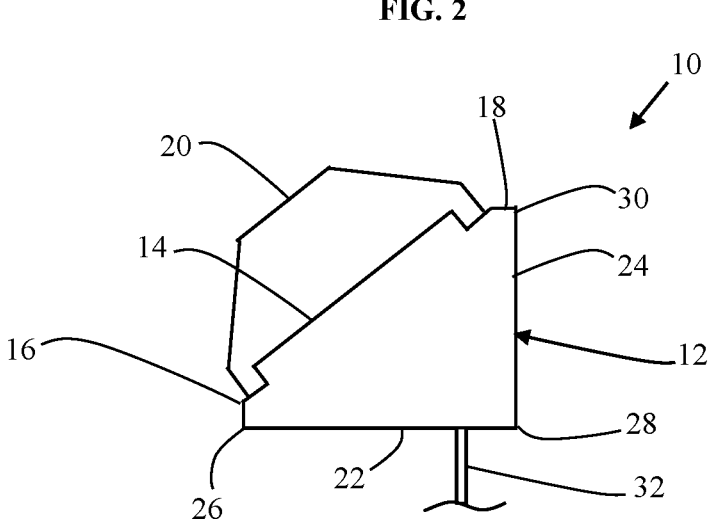
FIG. 1 is a schematic top view of an indicator device constructed in accordance with an embodiment of the invention.
FIG. 2 is a top schematic view of the embodiment of the invention shown in FIG. 1.

Referring to FIGS. 1-2, an indicator device constructed in accordance with the invention is generally designated by the reference numeral 10. In this embodiment, indicator device 10 includes a body 12 having a lateral wall 14, a first lateral wall side 16, a second lateral wall side 18 and an illumination device 20 mounted thereon.

Body 12 further includes an attachment wall 22 and support wall 24. Attachment wall 22 has a first edge which meets with first lateral wall side 16 to form a corner 26 and a second edge which meets with a first edge of support wall 24 to form a corner 28. Support wall 24 includes a second edge which meets with second lateral wall side 18 to form a corner 30. In this embodiment, illumination device 20 is powered and controlled by connector 32 which electrically connects with illumination device 20 and a power supply.

Illumination device 20 may be any type of light, such as a light emitting diode (LED).

First lateral wall side 16 protrudes from corner 26 to form a shoulder for elevating illumination device 20 and support wall 24 protrudes from corner 28 to form a generally triangular cross-sectional profile, whereby lateral wall 14 forms the hypotenuse of the triangular, and thus, illumination device 20 mounted thereon is on a downward slope from second lateral wall side 18 to first lateral wall side 16, and corner 26 forms an acute angle.

Figure 3:
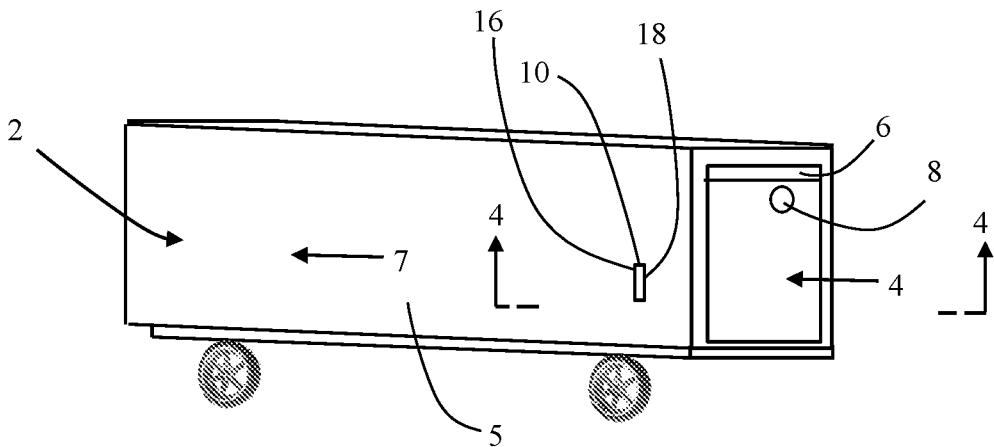
FIG. 3 is a schematic perspective view of the embodiment of the invention shown in FIG. 1 installed on a trailer section of a tractor trailer.
Figure 4:
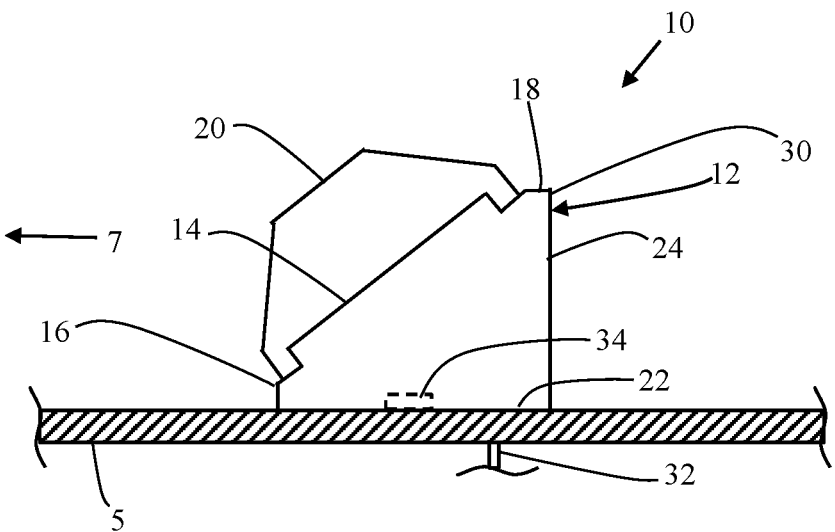
FIG. 4 is a schematic view along line 4-4 in FIG. 3.
Figure 5:
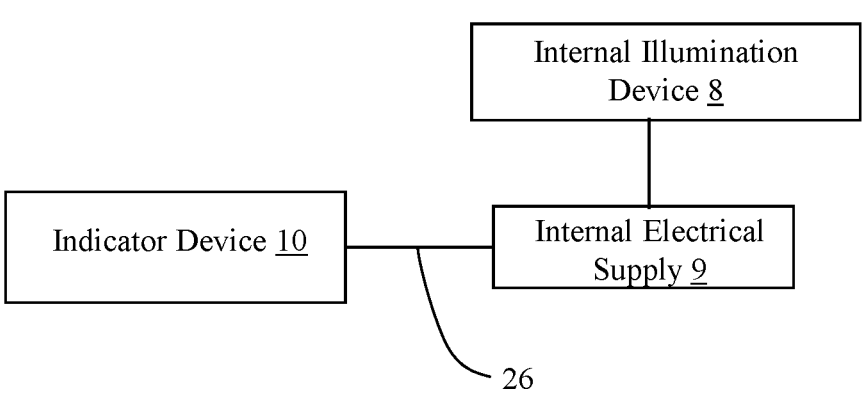
FIG. 5 is a schematic diagram of an exemplary electrical connection of the embodiment of the invention shown in FIG. 1 with an existing tractor trailer.

In this embodiment, an exemplary installation of device 10 is depicted in FIG. 3-5. Device is mounted on trailer section 2 of a tractor trailer via attachment 34 forming a secure connection with external wall 5 of trailer section 2, such that attachment wall 22 contacts trailer section wall Attachment 32 may include any conventional means for attaching device 10 to wall 5, such as screws or bolts. Device 10 is mounted to trailer section 2 with first lateral wall side 16 forward of the second lateral side 18. Thus, first lateral wall side 16 is closer to driver's position in a tractor trailer cab (not shown) and the slope of lateral wall 14 positions illumination device facing the driver side mirror as represented by arrow 7. When device 10 is mounted on wall 5, the shoulder formed by first lateral side wall 16 positions illumination device 20 at a distance away from wall that aligns illumination device 20 in the field of view for the driver side mirror, or passenger side mirror if device 10 were installed on the opposing wall of trailer section 2.

Trailer section 2 includes an enclosed cargo space 4 which is accessible through a cargo space access door 6. In this embodiment, cargo space access door 6 is depicted as a roll-up door, though other types of doors operate similarly. When cargo space access door 6 is in the open condition (as shown), internal illumination device 8 is illuminated. Internal illumination device 8 is connected with an internal power supply 9 through internal wiring (not shown), which may include a wire harness that connects with a tractor trailer cab section. Illumination of internal illumination device 8 may be triggered by a sensor adjacent door 6 which detects when door 6 is in the open condition. Connector 32, which may include one or more conductors, such as electrically conductive wires, is connected to the wires supplying power to internal illumination device 8 whereby illumination device 20 is also illuminated when electrical current is directed to illuminate illumination device 8.

Though the vehicle shown herein includes a cab section and a trailer section which are independent and can be pivotally connected as in a tractor trailer, in other embodiments the trailer section may be fixed to the cab portion, as in a delivery truck or van. It should be understood that the invention is not limited to any particular configuration of motor vehicle.

In other embodiments, illumination device 20 is powered by a battery, such as a rechargeable battery, and/or a solar cell. In some embodiments, body 12 includes a rechargeable battery, which may act as a backup, and the rechargeable battery is recharged by electricity received via connector 32 being connected with internal power supply 9, and which also actuates illumination device 20 at the same time internal illumination device 8 is illuminated.

While exemplary devices, apparatus, systems and methods of the invention have been described herein, it should also be understood that the foregoing is only illustrative of a few particular embodiments with exemplary and/or preferred features, as well as principles of the invention, and that various modifications can be made by those skilled in the art without departing from the scope and spirit of the invention. Therefore, the described embodiments should not be considered as limiting of the scope of the invention in any way. Accordingly, the invention embraces alternatives, modifications and variations which fall within the spirit and scope of the invention as set forth by the claims and any equivalents thereto.

The invention claimed is:

1. An indicator device which indicates when a door to an enclosed cargo space associated with a motor vehicle cargo section is in the open condition, the enclosed cargo space having an internal illumination device and an internal electrical connection to an internal power supply causing the internal illumination device to illuminate the enclosed cargo space responsive to the door being in the open condition, the indicator device comprising:

a) a body having a lateral wall defining a first lateral wall side and a second lateral wall side, wherein the first lateral wall side opposes the second lateral wall side, and an attachment portion adjacent to the first lateral wall side, wherein the attachment portion is configured to facilitate attaching the body to an external surface of the motor vehicle whereby the first lateral wall side is proximal to the wall of the vehicle and the second lateral wall side is distal from the external surface of the motor vehicle, the first lateral wall side being positioned between the lateral wall and the external surface of the motor vehicle, wherein the body further includes an attachment wall, the attachment wall defining a first attachment wall edge and a second attachment wall edge, the first attachment wall edge opposing the second attachment wall edge, wherein the attachment portion is defined on the attachment wall;

b) an open door indicator illumination device mounted on the lateral wall between the first lateral wall side and the second lateral wall side; and c) a connector in electrical communication with the open door indicator illumination device and the internal electrical connection, wherein the open door indicator illumination device illuminates responsive to the door being in the open condition.

2. The indicator device of claim 1, wherein the first attachment wall edge is connected to the first lateral wall side.

3. The indicator device of claim 2, wherein the body further comprises a support wall, the support wall defining a first support wall edge connected with the second attachment wall edge and a second support wall edge connected with the second lateral wall side.

4. The indicator device of claim 1, wherein the lateral wall is positioned at an acute angle with respect to the external surface of the motor vehicle.

5. The indicator device of claim 4, wherein the first lateral wall side defines a protruding shoulder for positioning the open door illumination device away from the external surface of the motor vehicle whereby the open door illumination device is aligned within the field of view of the driver side mirror.

6. The indicator device of claim 1, wherein the connector comprises a wired connection with the electrical connection.

* * * * *